US009200695B2

(12) United States Patent
Lamers et al.

(10) Patent No.: US 9,200,695 B2
(45) Date of Patent: Dec. 1, 2015

(54) SPRING AND DAMPER SYSTEM, IN PARTICULAR FOR AN ASSEMBLY MOUNT IN A MOTOR VEHICLE

(75) Inventors: Stephan Lamers, Altmannstein (DE); Thomas Conrad, Treuchtlingen (DE)

(73) Assignee: AUDI AG, Ingolstadt (DE)

( * ) Notice: Subject to any disclaimer, the term of this patent is extended or adjusted under 35 U.S.C. 154(b) by 153 days.

(21) Appl. No.: 13/979,573

(22) PCT Filed: Dec. 15, 2011

(86) PCT No.: PCT/EP2011/006327
§ 371 (c)(1),
(2), (4) Date: Jul. 12, 2013

(87) PCT Pub. No.: WO2012/095141
PCT Pub. Date: Jul. 19, 2012

(65) Prior Publication Data
US 2013/0300042 A1    Nov. 14, 2013

(30) Foreign Application Priority Data

Jan. 14, 2011    (DE) .......................... 10 2011 008 625

(51) Int. Cl.
*F16F 7/10* (2006.01)
*F16F 13/14* (2006.01)
(Continued)

(52) U.S. Cl.
CPC ............. *F16F 13/14* (2013.01); *F16F 13/1409* (2013.01); *F16F 13/1463* (2013.01); *F16F 7/104* (2013.01); *F16F 9/3405* (2013.01); *F16F 9/585* (2013.01)

(58) Field of Classification Search
CPC ............... F16F 7/00; F16F 7/10; F16F 7/104; F16F 9/00; F16F 9/32; F16F 9/3207; F16F 9/3405; F16F 9/58; F16F 9/585; F16F 13/00; F16F 2222/12; F16F 13/14; F16F 13/1409; F16F 13/1463; B60G 11/00; B60G 13/00; B60G 15/00; B60G 15/06
USPC ........................... 188/378, 379, 380; 267/136
See application file for complete search history.

(56) References Cited

U.S. PATENT DOCUMENTS 4,909,535 A * 3/1990 Clark et al. ................. 280/5.515
5,265,704 A * 11/1993 Landesfeind ................. 188/378
(Continued)

FOREIGN PATENT DOCUMENTS

CN    1485554    3/2004
DE    29 46 516    5/1981
(Continued)

OTHER PUBLICATIONS

International Search Report issued by the European Patent Office in International Application PCT/EP2011/006327 on Dec. 15, 2011.

*Primary Examiner* — Melody Burch
(74) *Attorney, Agent, or Firm* — Henry M. Feiereisen LLC

(57) ABSTRACT

A spring and damper system, in particular for an assembly mount in a motor vehicle, includes a spring/damper element arranged between two mutually, relatively displaceable vehicle masses, wherein the spring/damper element includes a damper device and a positioning spring element, which are directly or indirectly coupled with one another and are connected in series and which are supported on or attached to a respective vehicle mass. A progressive spring element forms an additional component of the spring/damper element, wherein the progressive spring element is arranged on a side of the positioning spring element facing away from the damper device and is directly or indirectly connected to the damper device or to the vehicle mass facing the positioning spring element. The progressive spring element has a defined gap spacing representing a spring deflection in a defined rest position.

14 Claims, 5 Drawing Sheets

(51) Int. Cl.
*F16M 1/00* (2006.01)
*F16F 9/34* (2006.01)
*F16F 9/58* (2006.01)
*F16F 7/104* (2006.01)

(56) References Cited

U.S. PATENT DOCUMENTS

| | | | |
|---|---|---|---|
| 5,337,864 A * | 8/1994 | Sjostrom | 188/378 |
| 5,906,254 A * | 5/1999 | Schmidt et al. | 188/378 |
| 6,729,611 B2 | 5/2004 | Deschaume et al. | |
| 7,810,819 B2 | 10/2010 | Lamers et al. | |
| 2003/0015830 A1 | 1/2003 | Miller et al. | |
| 2006/0071379 A1 | 4/2006 | Kato et al. | |
| 2008/0083591 A1 | 4/2008 | Berghus et al. | |
| 2012/0074627 A1 * | 3/2012 | Vervoordeldonk et al. | 267/136 |

FOREIGN PATENT DOCUMENTS

| | | |
|---|---|---|
| DE | 38 36 191 | 11/1989 |
| DE | 196 47 638 | 5/1998 |
| DE | 100 49 140 | 4/2002 |
| DE | 103 11 271 | 9/2004 |
| DE | 103 29 037 | 1/2005 |
| DE | 601 10 534 | 2/2006 |
| DE | 102004034567 | 2/2006 |
| EP | 1 387 111 | 2/2004 |
| EP | 1 467 119 | 10/2004 |
| GB | 2 165 804 | 4/1986 |
| JP | 2001-241490 | 9/2001 |

* cited by examiner

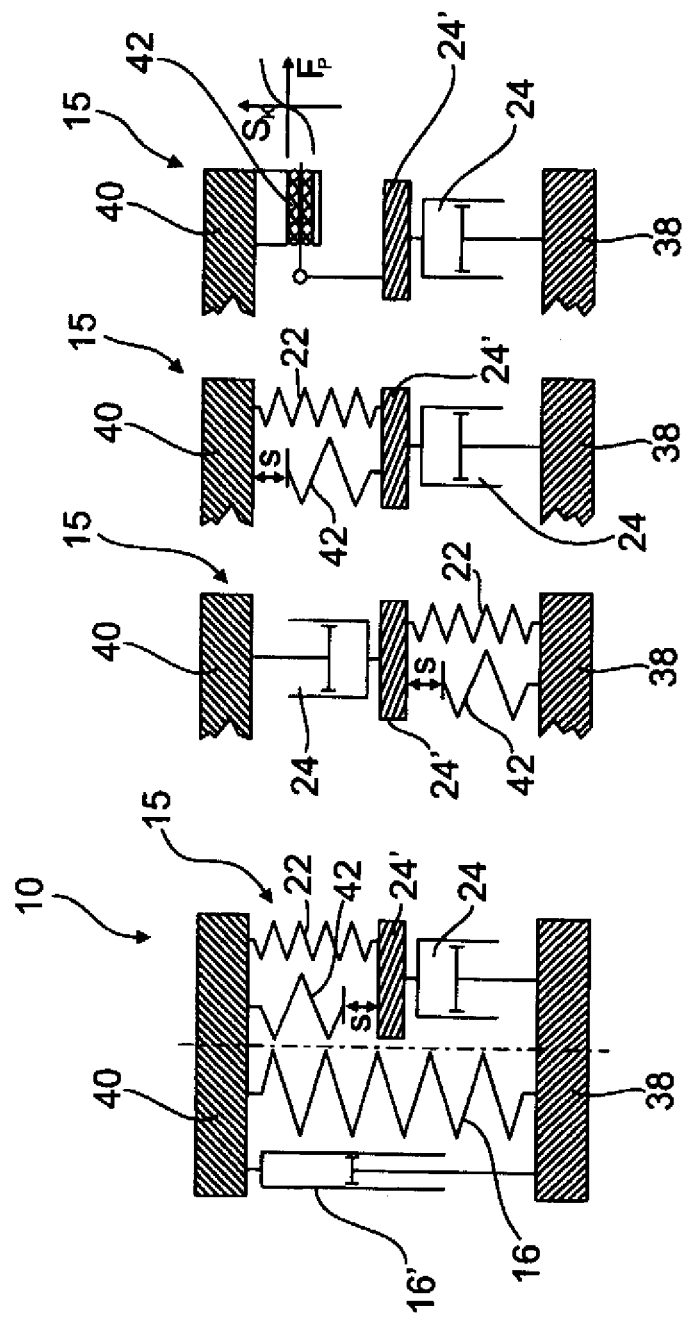

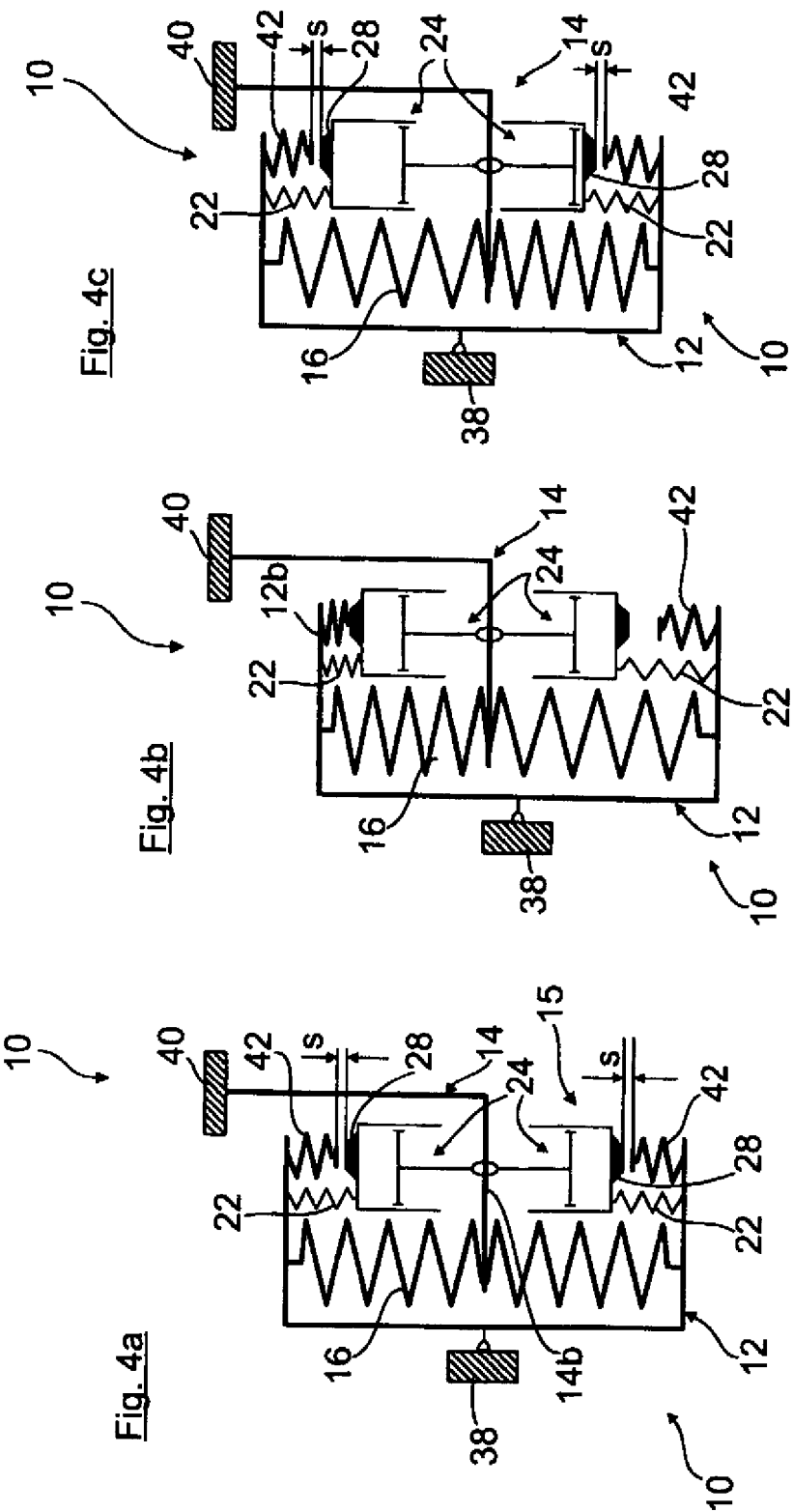

SPRING AND DAMPER SYSTEM, IN PARTICULAR FOR AN ASSEMBLY MOUNT IN A MOTOR VEHICLE

CROSS-REFERENCES TO RELATED APPLICATIONS

This application is the U.S. National Stage of International Application No. PCT/EP2011/006327, filed Dec. 15, 2011, which designated the United States and has been published as International Publication No. WO 2012/095141 A1 and which claims the priority of German Patent Application, Serial No. 10 2011 008 625.0, filed Jan. 14, 2011, pursuant to 35 U.S.C. 119(a)-(d).

BACKGROUND OF THE INVENTION

The invention relates to a spring and damper system, in particular for an assembly mount in a motor vehicle.

Subframe mounts or assembly mounts for motor vehicles, referred to hereinafter in general as assembly mounts, are widely known and are designed for damping high-frequency vibrations as well as for absorbing static and dynamic loads, and for supporting the assembly and/or vehicle movements, among others, in the vertical direction. To accommodate particularly high loads, rubber-elastic stops or springs are provided, which become effective after a defined spring deflection s (spring compression or spring rebound) and increase the spring rate of the mounts accordingly. In order to attain the desired spring characteristic with increasingly softer and harder spring rates, the assembly mounts must be relatively accurately matched to the type of the vehicle or the vehicle weight, the assembly equipment, etc., to prevent comfort-reducing shifts in the characteristic due to payloads, etc.

It is the object of the invention to propose a spring and damper system, in particular for an assembly mount in a motor vehicle, which can be used universally, has a simple structure and automatically adjusts to different load criteria.

SUMMARY OF THE INVENTION

According to one aspect of the invention, a spring and damper system, preferably for an assembly mount in a vehicle, in particular in a motor vehicle, with at least one spring/damper element is proposed, wherein the spring/damper element is disposed between two vehicle masses that are movable relative to one another, wherein the at least one a spring/damper element includes a damper device and a positioning spring element, which are directly or indirectly coupled to each other and are connected in series and which are supported on the respectively associated vehicle mass and/or are connected thereto. According to the invention, an additional single- or multi-part spring element in the form of a progressive spring element is disposed on the side of the positioning spring element of the spring/damper element facing away from the damper as an additional component of the spring/damper element which is directly or indirectly connected to the damper device and/or to the vehicle mass facing the positioning spring element and which forms in a defined rest position a defined gap on the side of the progressive spring element as free spring travel. The size of the gap spacing of the progressive spring element is defined by the length of the relaxed positioning spring element, and is only slightly influenced by disturbances of the damper device which is designed for speed-dependent force buildup, such as the hysteresis characteristic.

The vehicle masses are preferably formed here by a subframe and a vehicle body, by an additional frame and a drive assembly, or by a vehicle body and a drive assembly, between which at least one inventive spring and damper system is arranged as an assembly mount. It should be explicitly mentioned here that within the context of the present disclosure the term assembly mount is to understand as a generic term and in a comprehensive sense. An assembly mount within the context of the invention also refers to an additional frame mount disposed between the additional frame and the body, in particular an additional frame mount which in the quasi-static vehicle state is preloaded in the vertical direction (z), wherein the preload depends in particular on the respective kinematic arrangement of a vehicle-suspension spring as the main spring, the kinematic position of the additional frame mount itself (in particular the xy position in reference to the vehicle coordinate system) and the vehicle weight, which may vary depending on the load state or vehicle design. The preload may have either a positive or a negative direction.

The term assembly mount also refers to classical assembly mounts disposed between a subframe and an assembly (engine or transmission), or between a vehicle body and an assembly (engine or transmission), wherein the preload preferable depends on the mass of the supported assembly and the kinematic position of the assembly mount itself.

In general, the term assembly mount is therefore meant to include all mounts of a motor vehicle, where the invention may be used severally or in combination with other components or systems.

With such a structure according to the invention, a defined comfort deflection up to progression can thus be set in a passive manner, for example in conjunction with an assembly mount as a spring and damper system, without compromising on comfort. Because a spring and damper system according to the invention allows a simple preload-independent, in particular z-position-independent characteristic curve progression (the z-direction is here the direction of the vehicle's vertical axis).

In particular, the at least one spring/damper element may be designed so that for a defined load, in particular for a defined static or slow quasi-static relative displacement of the vehicle masses in the operative direction of the spring/damper element, the positioning spring element, designed to be relative soft, slowly tracks the damper device indirectly or directly with a small force, so that again a gap spacing of the progressive spring element is established, in particular approximately the gap spacing of the progressive spring element in the rest position, whereas conversely for a defined larger, in particular dynamic relative displacement of the vehicle masses in an operative direction of the spring/damper element, the positioning spring element no longer transmits sufficient force indirectly or directly on the damper device in order to effect a length compensation of the damper device, so that the damper device then transitions directly or indirectly, after bridging the gap spacing of the progressive spring element, into an abutting or operative connection with the progressive spring element and then also transmits, in addition to the relatively low spring force of the positioning spring element, the relatively high spring force of the progressive spring element. The damper device may be constructed in a known manner with elements integrated therein so that other than proportional dependences between damper force and rate of change in the length of the damper device can be realized as well, so that in extreme cases the damper device may even block when reaching a threshold damping force, thereby allowing within the context of the attachment of components of the damper device the transmission of an arbitrarily large force without change in length of the damper device by way of the progressive spring element arranged between the two vehicle masses coupled via the spring/damper element.

In principle, a single spring/damper element may be arranged between the two vehicle masses, so that the spring and damper system has a substantially preload-independent progression in one movement direction. Conversely, when a preload-dependent progression is to be enabled in several movement directions, in particular in two movement directions or in opposite movement directions, a first of the two vehicle masses may be supported on the second vehicle mass via several, in particular two spring/damper elements. This is preferably done by arranging on each of functionally opposite sides of the first vehicle mass a respective spring/damper element, which are supported with opposite effective direction on different sides of the first vehicle mass or on different regions of the second vehicle mass. In addition, according to a preferred embodiment, the damper device of the spring/damper elements may be attached to the first vehicle mass on opposite sides of the first vehicle mass, and the respective positioning spring element may be connected to the respective damper element.

In general, positioning spring element and the progressive spring element may be formed by several separate spring elements or by several spring element segments formed on a component to allow a simple functional separation of the components. According to an alternative embodiment, the positioning spring element and the progressive spring element may be formed by a single spring element, in particular by an elastomer element with a progressive spring characteristic, in particular a progressive spring characteristic with a high, rapidly increasing progression from a defined displacement path on.

Moreover, a support or additional spring device arranged between the two relatively movable vehicle masses may be associated with the spring and damper system of the present invention, which is connected in parallel with the at least one spring/damper element and completes, for example, an assembly mount. This additional spring assembly may be formed by a single additional spring element, in particular by a rubber-elastic support spring, or by an additional spring/shock absorber element with a spring element that is connected in parallel with a shock absorber.

Preferably, the at least one damper device of the spring and damper system is formed by a hydraulically acting damper. However, for example an electrically operating damper may also be employed. A combination or serial arrangement of a hydraulic and an electric damper device is also possible.

According to an actual embodiment according to the invention, two spring/damper elements form part of a hydraulically-damping assembly mount, for example, with a mount core attached to a vehicle representing a mass of the vehicle and an outer housing attached to a support member, such as an additional frame, representing an additional vehicle mass, as well as with a support wall inserted between the outer housing and the mount core with a rubber-elastic support spring, which subdivide the outer housing into an upper hydraulic chamber and a lower, closed hydraulic chamber. The hydraulic chambers filled with fluid are connected with each other via at least one throttle device having a defined flow cross-section. Stops forming progressive spring elements and acting in opposite directions are provided between the mount core and the outer housing, wherein each stop is retained by at least one telescopically displaceable, volume-variable damper device provided for each hydraulic chamber, wherein the damper devices are, on one hand, supported on the support wall of the support core and connected with one another via throttle devices provided in the support wall and having a defined flow cross section, wherein furthermore a respective adjustment spring as positioning spring element is arranged between the outer housing and the stops. The adjustment springs with lower spring stiffness track the stops at a slow quasi-static movement of the mount core relative to the outer housing in the vertical or z-direction, for example due to changes in the load, in order to maintain the free deflection of the rubber-elastic mount spring until the stops become effective. At a higher, dynamic load, the damper devices operate due to the integrated throttle devices as a hydraulic shock absorber until they are blocked, causing the majority of the dynamic load to be transmitted from the mount core via the respective damper element and the stops to the outer housing.

To simplify the design and manufacture, the assembly mount may be formed substantially rotationally symmetrical with a barrel-shaped outer housing, a mount core formed by a connection bushing and an annular disk-shaped support wall and a mount spring fixedly connected in an annular fashion between the support wall and the peripheral walls of the outer housing, wherein the damper devices in the hydraulic chambers are formed by telescopically movable ring cylinders, with one of the ring cylinders carrying the for example ring-shaped stop and the other corresponding ring cylinder being supported on the support wall.

Accordingly, the adjustment springs may also be disposed annularly about the ring cylinder carrying the stops and delimit the tops and bottoms of the hydraulic chambers in conjunction with annular walls inserted in the ring cylinders. This results in a relatively simple and readily manufacturable mount design with few components that can be inserted in the outer housing of the assembly mount.

To attain a particularly robust structure, the adjustment springs may be supported on the peripheral walls of the outer housing by V-shaped outwardly projecting walls, allowing adjustment of defined spring characteristics.

Furthermore, for adjusting specific damping characteristics of the assembly mount, overflow channels between the damper devices may be inserted in the support wall between the hydraulic chambers and additional overflow channels between the hydraulic chambers, wherein throttle valves with defined flow cross-sections are inserted between the damper devices.

For ensuring fluid exchange to improve the functionality of the mount, the overflow channels of the hydraulic chambers and of the damper devices may be connected to each other by cross channels with optionally inserted throttle valves.

For ease of manufacture, the adjustment springs delimiting the assembly mount toward the top and the bottom, the limit springs and the annular walls may be firmly connected with the corresponding ring cylinders so as to form a pre-assembled unit, by adhesive bonding, vulcanizing, etc., to be attached, for example, in the outer housing after affixing a support spring.

The annular support spring may be formed of at least two annular bodies that are fixedly connected to one another by a metal sleeve having partial recesses for a specific adjustment of the spring characteristic of the support spring.

BRIEF DESCRIPTION OF THE DRAWING

The invention will be explained in more detail below with reference to a specific exemplary embodiment, and with reference to several schematic diagrams. The schematic figures show in:

FIGS. 1a to 1e schematic diagrams for explaining the general concept of the invention;

FIG. 4a a schematic diagram of the assembly mount in a central position in accordance with FIG. 2, which corresponds for example to the designed position of the motor vehicle with a defined, static load;

FIG. 4b an additional schematic diagram of the assembly mount in dynamic fully extended (rebound) position, wherein the upper stop cooperates with the outer housing; and FIG. 4c an additional schematic diagram of the assembly mount in the compressed position, for example at a high static load or a corresponding payload of the vehicle.

FIGS. 1a to 1e illustrate the overall concept of the invention with reference to different schematic diagrams, wherein identical parts are designated by identical reference numerals.

DETAILED DESCRIPTION OF PREFERRED EMBODIMENTS

Figure 1E:
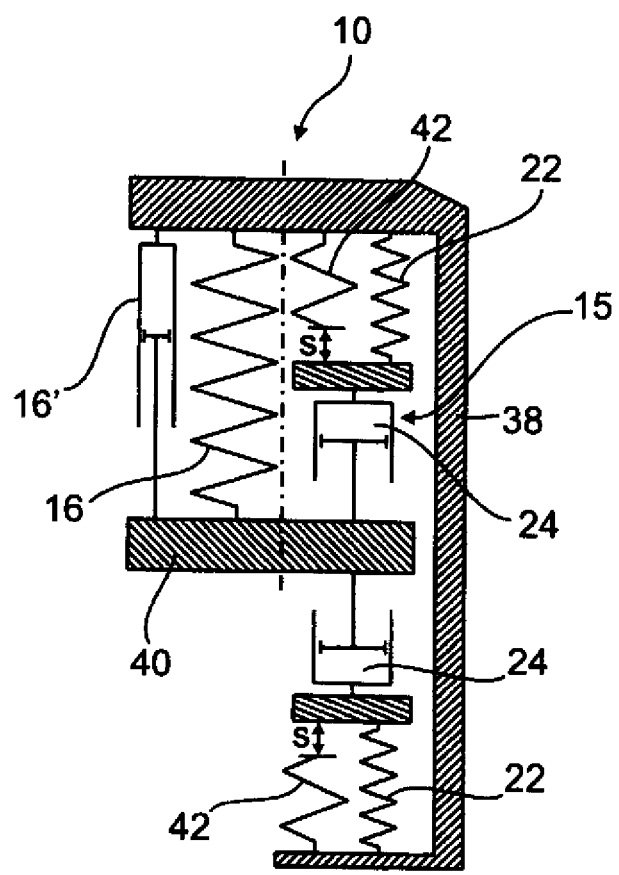

FIG. 1 shows a spring and damper system 10 according to the invention, for example an engine mount in a motor vehicle, acting in a direction of movement, with a single spring/damper element 15, which is arranged between two relatively displaceable vehicle masses 38 and 40, in particular between a subframe 38 and a vehicle body 40, wherein the spring/damper element 15 includes a damper device 24, a positioning spring element 22, and a progressive spring element 42, wherein the damper device 24 and the positioning spring element 22 are coupled to each other and connected in series, for example via a coupling element 24', which are supported on and connected to the respectively associated vehicle masses 38 and 40. The for example one-piece progressive spring element 42 is arranged as an additional component of the spring/damper element 15 on the side of the positioning spring element of the spring/damper element 15 facing away from the damper device and forms a functional part of the spring/damper element 15, and is connected here to the vehicle mass 40 facing the positioning spring element, forming in the rest position or design position shown in FIG. 1a a defined gap distance s on the side of the progressive spring element as a soft deflection with relatively low stiffness of the spring and damper system 15, here as a direct gap spacing s to the coupling element 24 or to the damper device 24. The coupling element 24' may be formed integrally, in particular as one piece, with the damper device 24, or may otherwise be formed by a separate component that is fixedly connected to the damper device 24.

The spring/damper element is here designed such that the positioning spring element 22 tracks the damper device 24 at a specified load, in particular at a defined static or quasi-static load, and a resulting slow relative displacement of the two vehicle masses 38, 40 so as to maintain the gap spacing s of the progressive spring element corresponding to the rest position, whereas for a correspondingly larger, in particular dynamic, load the positioning spring element 22 does not transmit enough power directly or indirectly to the damper device 24 so as to effect a length compensation of the damper device 24, thus causing the damper device 24 to go indirectly into abutting or operative engagement with the progressive spring element 42 via the coupling element 24' after bridging the gap spacing s of the progressive spring element, thus transmitting the relatively high spring force of the progressive spring element 42 in addition to the relatively low spring force of the positioning spring element 22. The damper device 24 may be constructed in a known manner by using integrated elements so as to realize other than proportional dependencies between damper force and the rate of change in the length of the damper device 24, allowing the damper device 24 to be blocked in extreme cases when a threshold damping force is reached.

The spring and damper system shown in FIG. 1a furthermore includes an additional spring assembly arranged between the two relatively movable vehicle masses 38, 40, which is in the illustrated embodiment connected in parallel with the spring/damper element 15 substantially formed by the components 22, 24, 42. The additional spring assembly is formed here by a conventional spring/damper element with a support spring 16 connected in parallel with a shock absorber device 16'. With appropriate compression and rebound of the additional spring assembly and depending on the load, one of the aforedescribed load situations in the region of the spring/damper element 15 formed by the components 22, 24, 42 is attained.

FIG. 1b shows an alternative embodiment compared to FIG. 1a, wherein the left side with the additional spring assembly is not shown for sake of simplicity. The spring/damper element is here reversed compared to FIG. 1a, namely such that the positioning spring 22 and the progressive spring are disposed between the vehicle mass 38 and the damper device 24, while the damper device 24 is now supported on the vehicle frame 40. Otherwise, the structure and operation correspond to that of FIG. 1a.

FIG. 1c shows an additional modification of FIG. 1a, wherein the left side with the additional spring assembly is also not shown for the sake of simplicity. The progressive spring element is here connected on the damper side, for example on the coupling element 24' of the damper device 24, and has a gap spacing s to the vehicle mass 40. Otherwise, the structure and operation correspond to that of FIG. 1a.

While positioning spring element 22 and the progressive spring element 42 or 28 and 42 have been illustrated as formed by separate spring elements, it will be understood that the positioning spring element 22 and the progressive spring element 42 may also be formed by a plurality of spring element segments formed on a component or that the positioning spring element 22 and the progressive spring element 42 may be formed by a single spring element, as shown for example in FIG. 1c in conjunction with an elastomer element 42, wherein the elastomer element 42 has a progressive spring characteristic, in particular a progressive spring characteristic with a rapidly increasing high progression from a defined displacement path on.

Figure 2:
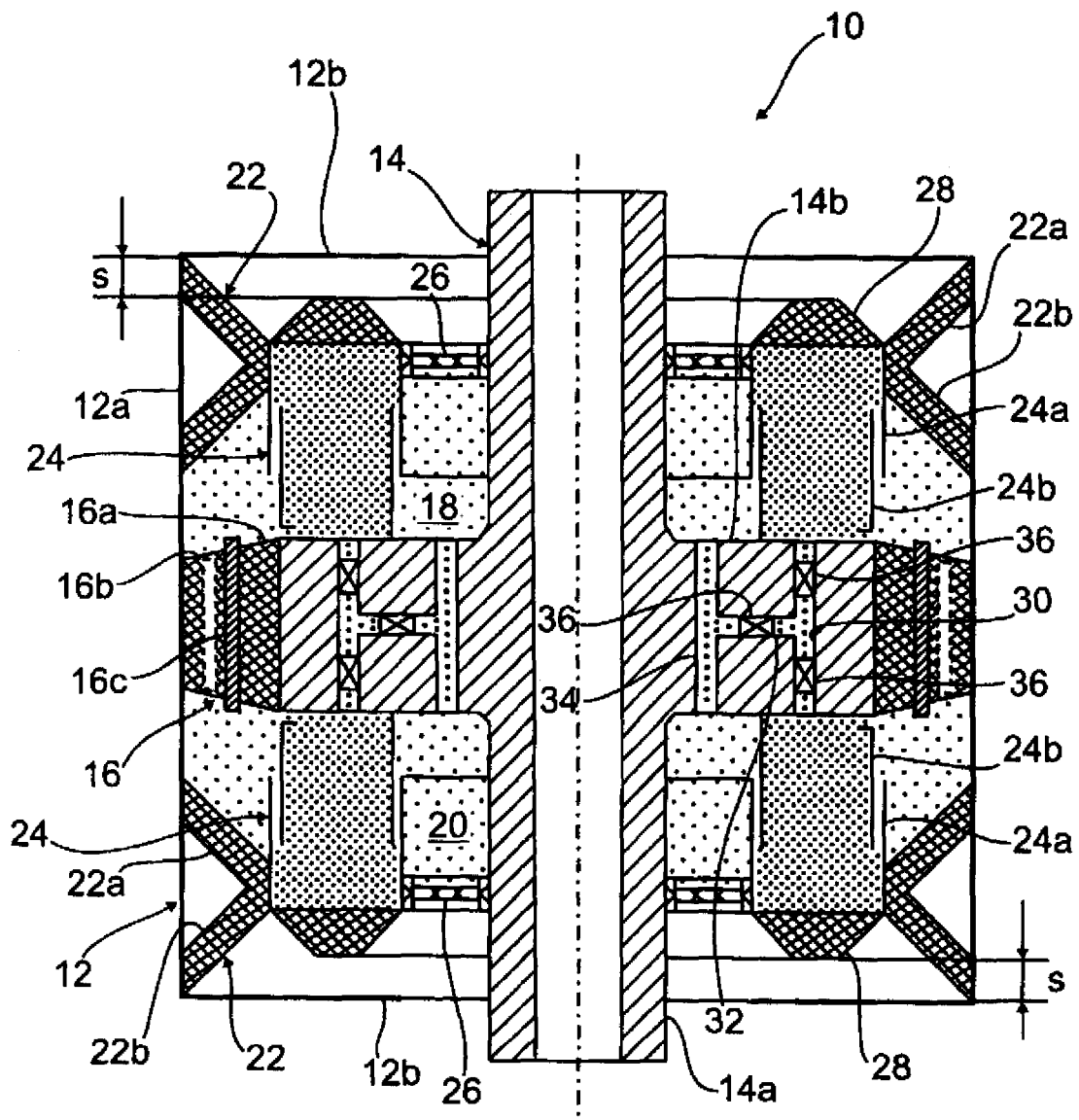
FIG. 2 a longitudinal section through a hydraulically damping assembly mount for a subframe for a motor vehicle, with an outer housing, a support mount having a support wall and a support spring and with damper devices inserted in hydraulic chambers of the assembly mount which carry stops cooperating with the outer housing via adjustment springs.

FIG. 1e shows a structure corresponding in principle to that of the subsequent FIG. 2, wherein a suspension spring 16, together with a shock absorber device 16' is again operatively connected as a conventional spring/damper element, similar to the embodiment of FIGS. 1a to 1d, in parallel with the spring/damper elements 15 formed by the components 22, 24, 42.

A concrete implementation of the concept of the invention in conjunction with a hydraulically damping assembly mount 10 will now be schematically described and illustrated in detail with reference to FIG. 2. The assembly mount 10 shown in FIG. 2 has a rotationally symmetrical, barrel-shaped outer housing 12, a mount core 14 with a connection bushing 14a and an integrally formed support wall 14b, as well as a support spring 16 composed of two annular mount members 16a, 16b and an intermediately inserted metal ring 16c.

The rubber-elastic support spring 16 is attached or vulcanized to the outer periphery of the support wall 14b and to the peripheral wall 12a of the outer housing 12 and transmits the base load from the assembly mount 10 acting on the mount core 14.

The assembly mount 10 is affixed in an unillustrated manner with its outer housing 12, for example, on a subframe of the motor vehicle as the first vehicle mass, whereas the connection bushing 14a of the mount core 14 protruding from the outer housing 12 may be screwed to a vehicle body or to a body of the motor vehicle (for example to a longitudinal rail or cross member) as a second vehicle mass. For example, wheel guiding components and/or a drive assembly (motor and/or transmission) may be articulated on the additional frame in a known manner. The term assembly mount is expressly to be understood here in a broad sense. For example, such assembly mounts may also be used between a vehicle body or an subframe and a drive assembly, just to name a few additional examples.

The support wall 14b and the support spring 16 divide the outer housing 12 into an upper and a lower ring-shaped hydraulic chamber 18, 20, which are filled with hydraulic fluid (indicated by dots).

The hydraulic chambers 18, 20 are each closed off toward the top and the bottom by a respective annular adjustment spring 22 abutting the peripheral wall 12a and forming here a positioning spring element, by damper elements 24 integrated in the hydraulic chambers 18, 20, and by annular rubber-elastic, expandable ring walls 26 abutting the connection bushing 14a.

The damper devices 24 are each composed of two mutually telescopically displaceable ring cylinders 24a, 24b that form a ring-shaped volume and are also filled with hydraulic fluid, wherein the respective outer ring cylinder 24a facing the end wall 12b of the outer housing 12 forms a type of coupling element and has, for example, an annular rubber-elastic stop 28 forming a progressive spring element, which has in the illustrated center position of the assembly mount 10 a gap spacing s of the progressive spring element representing a free compression spring deflection (bottom) for the supporting spring 16 or a rebound spring deflection (top) toward the end wall 12b of the outer housing 12.

The respective inner ring cylinder 24b of the damper devices 24 is supported on the support wall 14b of the mount core 14. The two ring cylinders 24a, 24b are connected with one another via overflow channels 30 disposed in the support wall 14b. The overflow channels 30 are also connected via cross channels 32 to adjacent overflow channels 34 which open into the two hydraulic chambers 18, 20, as illustrated.

Throttle valves 36 are also inserted in the overflow channels 30, 32 having defined cross-sections, which determine the damping characteristics of the damper devices 24, but also of the hydraulic chambers 18, 20, as a function of the frequency under dynamic load.

The adjustment springs 22 having walls 22a, 22b that diverge with a V-shape toward the peripheral wall 12a have lower spring stiffness than the support spring 16 and the rubber-elastic stops 28.

Figure 3:
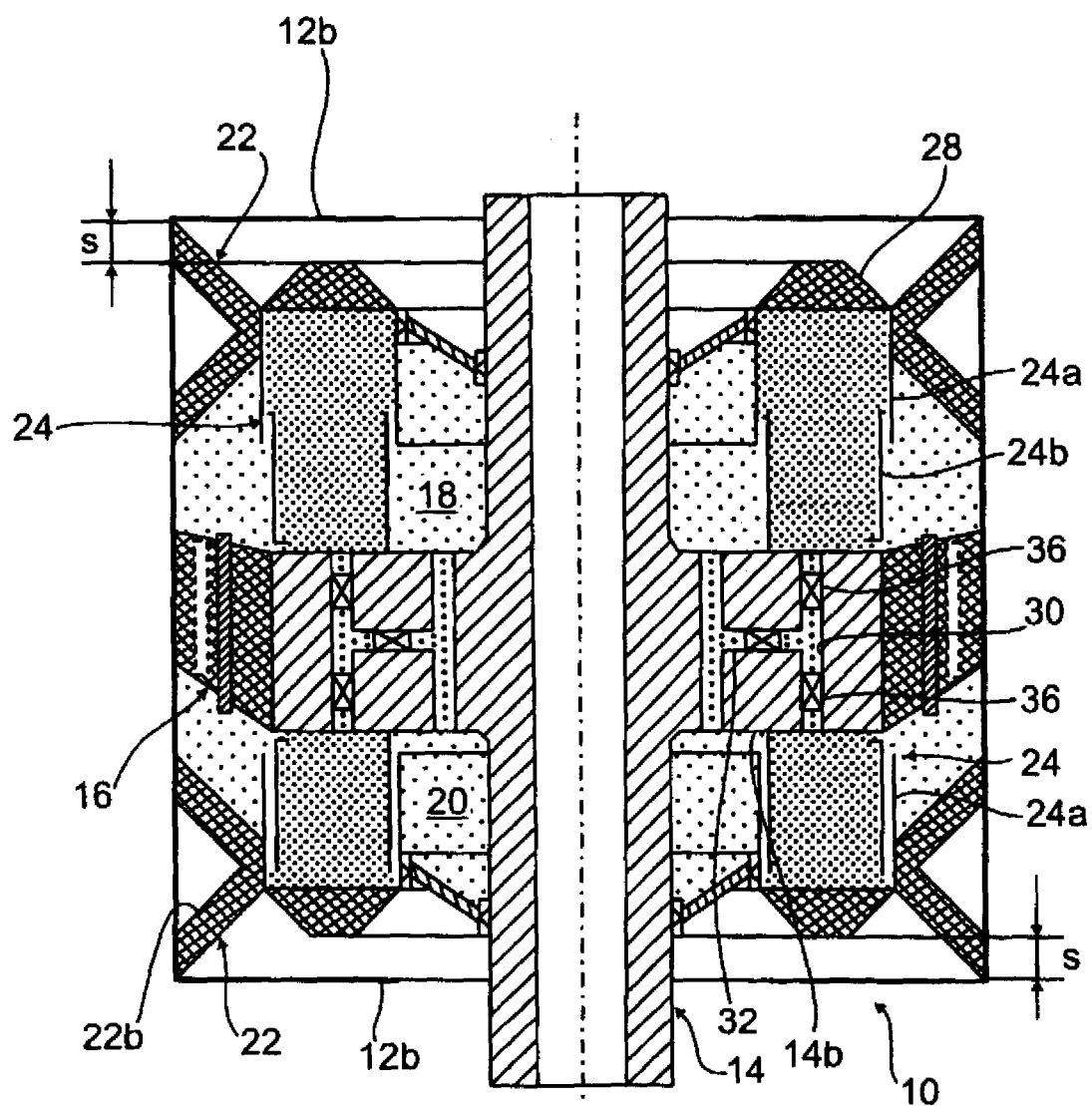
FIG. 3 the assembly mount shown in FIG. 2 with a support spring displaced by a static load and stops suitably tracked by the damper devices for maintaining the spring compression and rebound deflection s.

When the assembly mount 10 shown in FIG. 2-whose illustrated center position corresponds to a defined base load (rest or design position)—is statically loaded, for example, by a higher payload, it assumes the position shown in FIG. 3, wherein the mount core 14 and the support spring 16 are shifted downward. This would cause the lower stop 28 to abut the end wall 12b of the outer housing 12 or the gap distance s of the progressive spring element to be exhausted, so that the spring characteristic of the assembly mount 10 then shifts accordingly, reducing comfort.

However, this effect is contravened by the adjustment springs 22 representing positioning spring elements, which maintain the outer ring cylinders 24a in the same position relative to the outer housing 12 of the assembly mount 10, while the inner ring cylinders 24b together with the mount core 14 and the support wall 14b are moved downward through displacement of the hydraulic oil residing in the damper devices 24 through the overflow channels 30 and the throttle valves 36. The gap distances s of the progressive spring element and the spring compression and rebound deflection are maintained within the structurally specified framework.

Only faster bottoming-out of the assembly mount 10 due to a higher dynamic load (for example when driving over a bump in the road) has the effect that the adjustment spring 22 can no longer simultaneously track the ring cylinder 24a due to the damping effect of the damper elements 24 specified by the channels 30, 32 and the throttle valves 36, so that depending on the loading direction, the lower gap spacing s of the progressive spring element and the upper gap spacing s of the progressive spring element are exhausted, thereby causing the harder stop 28 forming the progressive spring element to strike the end wall 12b of the outer housing 12 or become effective.

The mechanism of operation is identical in the compression and rebound direction of the assembly mount 10.

FIGS. 4a to 4c show schematic diagrams of the assembly mount 10, wherein functionally identical parts are designated by identical reference numerals, but are illustrated in simpler form.

FIG. 4a shows the static central position of the assembly mount 10 similar to FIG. 1 (rest position or design position) determined by the gap spacing s of the upper progressive spring element and gap spacing s of the lower progressive spring element disposed between the mount core 14 connected to the structure 40 of the vehicle 14 and the outer housing 12 connected to the subframe 38, with a suitable design of the support spring 16 and the damper device 24 in conjunction with the adjustment springs 22. The assembly mount may, of course, also be designed so that the upper and the lower gap spacings of the progressive spring element are quantitatively different in the rest position. Stop springs 42 connected to the outer housing 12 are associated with the stops 28 forming the progressive spring elements, which define the gap spacings s of the progressive spring elements and also form part of the progressive spring elements. Such a design with an associated stop spring would in principle also be possible in embodiment shown in FIGS. 2 and 3, for example in the form of an additional elastomer stop arranged spaced apart (gap distance s) from the stop 28 on the outer housing 12, which is not illustrated here.

FIG. 4c shows the position of the assembly mount 10 shown in FIG. 3, but compressed from the central position by a payload, wherein the gap spacings s of the progressive spring element caused by the adjustment springs 22 and the damper devices 24 are still maintained by making use of the available mutual displacement deflection of the ring cylinders 24a, 24b, i.e. the comfortable spring characteristic is thus still largely defined without inserting the harder stops 28, 42. The relatively soft spring characteristic is thus still maintained in this situation, resulting in more comfortable vibration damping and noise attenuation.

Lastly, FIG. 4b shows a state of the assembly mount 10, wherein the assembly mount 10 and/or the mount core 14 is accelerated under dynamic load above a defined force amplitude-frequency ratio from the central position (FIGS. 2 and 4a) in the rebound direction, causing the damper devices 24 to be stiffened or blocked and thus to overcome the holding forces of the adjustment springs 22. Consequently, with appropriate deformation of the adjustment springs 22, the upper stop 28 (optionally with the stop spring 42) is brought into operative abutment against the upper end wall 12b of the outer housing 12, thereby increasing the overall spring rate of the assembly mount 10 accordingly.

Depending on the design of the overflow channels 30, 32, 34 (FIGS. 2 and 3) and of the throttle valves 36, the hydraulic damping effect of the assembly mount 10 can be influenced specifically for attenuating high frequency vibrations and damping lower natural frequencies of the body.

What is claimed is:

1. A hydraulically damping assembly mount in a motor vehicle, having a spring and damper system comprising:
    at least two spring/damper elements arranged between a first vehicle mass and a second vehicle mass relatively displaceable in relation to the first vehicle mass, wherein each of the at least two spring/damper elements comprises
    a damper device and a first positioning, spring element, which are directly or indirectly coupled with one another and are connected in series and which are supported on or attached to a respective one of the first and second vehicle masses, and
    a one-part or multi-part progressive spring element having two ends and forming an additional component of each spring/damper element, wherein one of the ends is directly or indirectly connected to the damper device or to one of the first vehicle mass and the second vehicle mass and the other end forms in a defined rest position of the progressive spring element a defined gap having a pap spacing with one of the second vehicle mass and the first vehicle mass or the damper device,
    a mount core attached to the first vehicle mass and an outer housing attached to a structural member representing the second vehicle mass,
    a support wall inserted between the outer housing and the mount core and having a rubber-elastic support spring, with the support wall and the support spring dividing the outer housing into an upper and a lower closed liquid-filled hydraulic chamber,
    at least one throttle device with a defined flow cross section disposed in the support wall and interconnecting the upper and lower liquid-filled hydraulic chambers,
    stops disposed between the mount core and the outer housing, with the stops acting in opposite directions as the progressive spring element, wherein each stop is retained by at least one of the damper devices of the at least two spring/damper elements supported on the support wall,
    an adjustment spring disposed between the outer housing and the stops and representing a second positioning spring element, and
    overflow channels disposed in the support wall and interconnecting the damper devices of different ones of the at least two spring/damper elements.

2. The assembly mount of claim 1, wherein a size of the gap spacing is defined by a length of the second positioning spring element in a relaxed state or by a hysteresis characteristic of a damper device of the at least two spring/damper elements, or both.

3. The assembly mount of claim 1, wherein each of the at least two spring/damper elements is constructed so that the first positioning spring element tracks the damper device of the at least two spring/damper elements under a defined static or quasi-static load, and with a resulting relative displacement between the first and second vehicle masses in the functional direction of the spring/damper element, so as to make the gap spacing approximately identical to the gap spacing in the rest position, whereas under a defined dynamic load, a time-dependent and load-dependent length adjustment of the damper device is insufficient to keep a change in the gap spacing smaller than the gap spacing under the static or quasi-static load, so that the progressive spring element is then moved into abutting and operative engagement with a corresponding associated component on the side of the gap spacing by bridging the gap spacing.

4. The assembly mount of claim 1, wherein the second positioning spring element and the progressive spring element are formed by separate spring elements or by several spring element segments formed on a component, or wherein the second positioning spring element and the progressive spring element are formed by a single spring element having a progressive spring characteristic curve that starts at a defined displacement path.

5. The assembly mount of claim 1, wherein the assembly mount is substantially rotationally symmetrical and comprises the outer housing shaped as a barrel, wherein the mount core is formed by a connecting bushing and the support wall is shaped as an annular disk, and wherein the support spring is annularly connected between the support wall and peripheral walls of the outer housing.

6. The assembly mount of claim 1, wherein the damper device of each of the at least two spring/damper elements is constructed by telescopically mutually displaceable ring cylinders, with one of the ring cylinders carrying the stop having an annular shape and another of the ring cylinders being supported on the support wall.

7. The assembly mount of claim 6, wherein the adjustment spring is arranged annularly around the ring cylinder carrying the stop and in conjunction with annular walls inserted in the ring cylinders delimits the hydraulic chambers toward a top and a bottom.

8. The assembly mount of claim 7, wherein the adjustment spring is supported on a peripheral wall of the outer housing by V-shaped outwardly projecting walls.

9. The assembly mount of claim 1, further comprising throttle valves with a defined flow cross-section inserted at least in the overflow channels between the damper devices.

10. The assembly mount of claim 1, wherein the at least one throttle device connecting the hydraulic chambers and the overflow channels connecting the damper devices are interconnected by cross channels having optionally inserted throttle valves.

11. The assembly mount of claim 7, wherein the adjustment spring, the stops and the annular walls, which are expandable, are fixedly connected with the corresponding ring cylinders to form a pre-assembly unit.

12. The assembly mount of the claim 1, wherein the rubber-elastic support spring has an annular shape and is formed of at least two annular members that are firmly interconnected by a sleeve.

13. The assembly mount of claim 1, wherein the at least two spring/damper elements are arranged as an assembly mount or as part of an assembly mount between a subframe and a vehicle body, or between a subframe and a drive assembly, or between a vehicle body and a drive assembly.

14. The assembly mount of the claim 12, wherein the sleeve is a metal sleeve.

* * * * *